C. F. KETTERING AND W. A. CHRYST.
ENGINE STARTING SYSTEM.
APPLICATION FILED OCT. 11, 1915.
1,303,831.
Patented May 13, 1919.
5 SHEETS—SHEET 1.
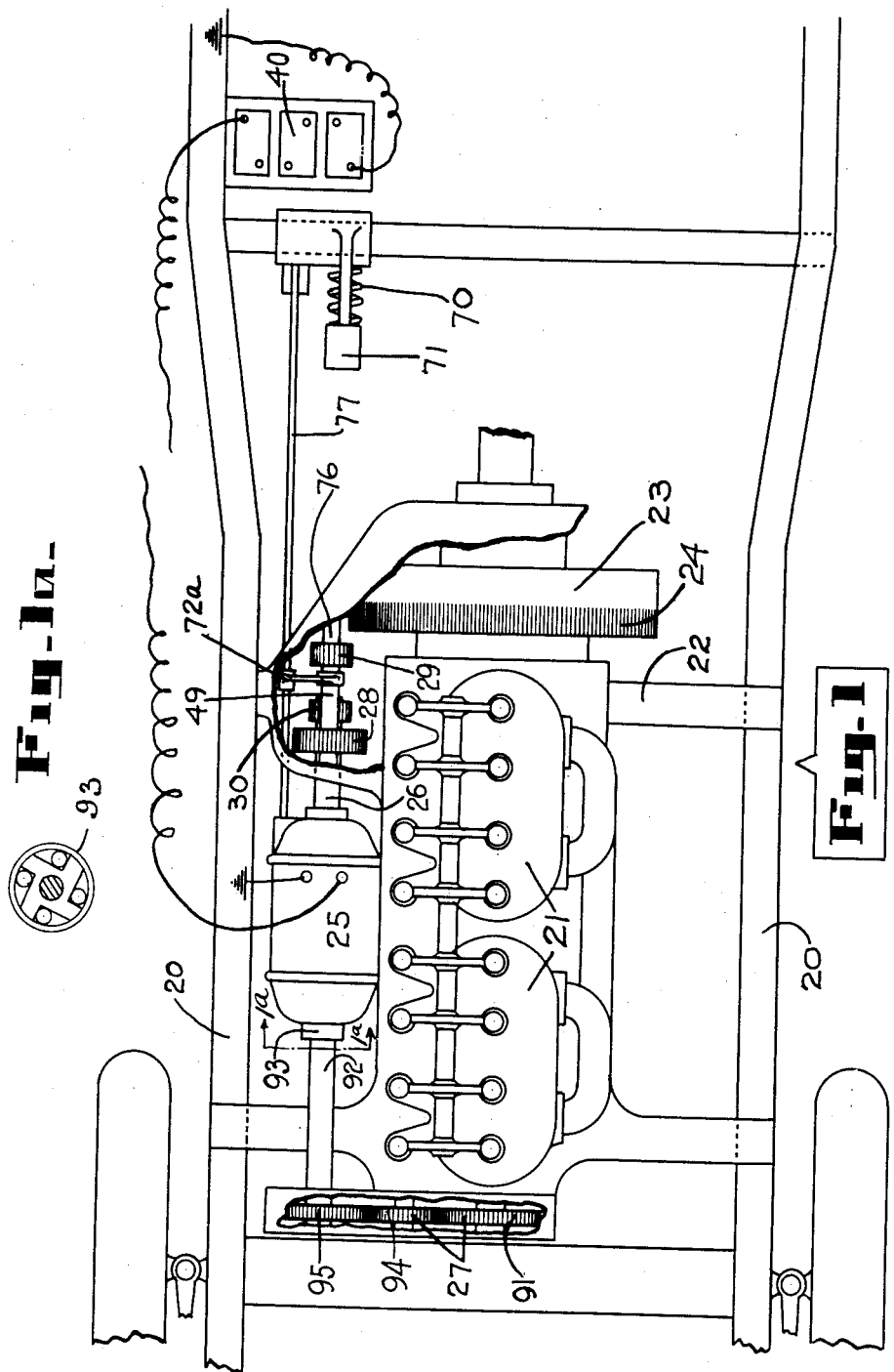

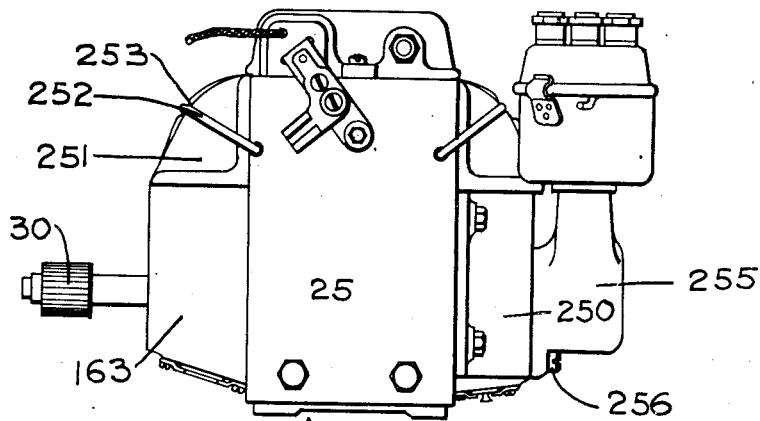
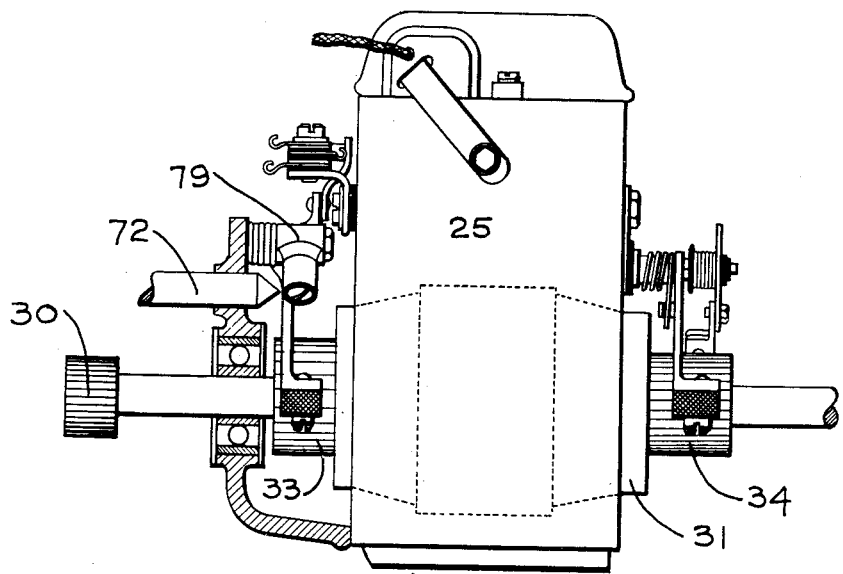

C. F. KETTERING AND W. A. CHRYST.
ENGINE STARTING SYSTEM.
APPLICATION FILED OCT. 11, 1915.

1,303,831.

Patented May 13, 1919.
5 SHEETS—SHEET 3.

Witnesses
Inventors
Charles F. Kettering
and William A. Chryst
By Kerr, Page, Cooper and Hayward
Attorneys.

C. F. KETTERING AND W. A. CHRYST.
ENGINE STARTING SYSTEM.
APPLICATION FILED OCT. 11, 1915.

1,303,831.

Patented May 13, 1919.
5 SHEETS—SHEET 4.

Witnesses
Walter N. Riedel
Joseph W. McDonald

Inventors
Charles F. Kettering
and William A. Chryst
By Kerr, Page, Cooper and Hayward
Attorneys C. F. KETTERING AND W. A. CHRYST.
ENGINE STARTING SYSTEM.
APPLICATION FILED OCT. 11, 1915.

1,303,831.

Patented May 13, 1919.
5 SHEETS—SHEET 5.

Witnesses
Walter W. Riedel
Joseph W. McDonald

Inventors
Charles F. Kettering and
William A. Chryst
By Kerr, Page, Cooper and Hayward
Attorneys.

UNITED STATES PATENT OFFICE.

CHARLES F. KETTERING AND WILLIAM A. CHRYST, OF DAYTON, OHIO, ASSIGNORS TO THE DAYTON ENGINEERING LABORATORIES COMPANY, A CORPORATION OF OHIO.

ENGINE STARTING SYSTEM.

1,303,831.  Specification of Letters Patent.  Patented May 13, 1919.

Application filed October 11, 1915. Serial No. 55,160.

*To all whom it may concern:*

Be it known that we, CHARLES F. KETTERING and WILLIAM A. CHRYST, citizens of the United States of America, residing at Dayton, county of Montgomery, and State of Ohio, have invented certain new and useful Improvements in Engine Starting Systems, of which the following is a full, clear, and exact description.

This invention relates to a system of devices adapted for supplying power to start an engine and the engine when thus started, is arranged to store up power for similar future starting operations, and this same power source may then be used to supply current for the ignition system of the engine, and for any other purposes which may be desired.

That is, in the particular form hereinafter described, as embodying our invention, we have provided a system of starting devices which is particularly adapted for use in connection with motor vehicles, wherein an engine forms the power plant, or a part of the power plant, so as to eliminate the manual starting of the engine, and to facilitate the automatic starting thereof.

It is one of the objects of the present invention to provide a system of starting devices, wherein the dynamo electric machine, when operating as a generator, is controlled as to its output, by what may be termed third brush regulation or excitation, and this regulation is so combined with certain controlling devices, that the regulating effect is rendered un-objectionable during the operation of the electric machine as a motor.

A further object of the present invention is to utilize the generator windings and electrical connections connecting the third brush regulating circuit to operate the electric machine as a motor, with a reduced torque and speed effect initially, so as to facilitate the connecting up of the electric machine to the engine for starting purposes, and then changing the circuit arrangements of the generator, so as to assist the motor operation of the electric machine for actual starting purposes, so as to assist in the cranking of the engine.

A further object of the present invention is to provide a system including a dynamo electric machine, which is controlled as to its operation as a generator, or as a motor, by the manipulation of the motor and generator commutator brushes; this same manipulation of the brushes may also control the regulating circuit of the machine when operating as a generator.

Another object of the present invention resides in the provision of a dynamo electric machine, capable of operation as a motor for starting purposes, and as a generator for charging purposes, which includes mechanism operable to dis-establish the motor circuit by moving the motor commutator brushes out of contact with the motor commutator, whereby any lag, due to the frictional resistance of the motor brushes rubbing against the motor commutator during the generating function of the machine, will be eliminated.

Another object of the present invention is to connect a work circuit, such as an ignition circuit, with the field circuit of the generator, and then providing a common operating element for controlling the opening and closing of the generator circuits, which will concomitantly close the ignition circuit. As a result of this, it will be noted that it will be impossible for the operator of the system to close the generator circuit, without establishing ignition for the engine.

A further object of the present invention is to provide an electrical system having a plurality of work circuits, including protective devices adapted to be brought into operation, during the occurrence of overloads in said circuits. One of these protective devices, which is combined with certain of the work circuits, will tend to disestablish said circuit, and to maintain said circuit in dis-established condition, until the over-load is removed, while another of the protective devices, combined with certain other circuits, will tend to intermittently make and break said circuits throughout the occurrence of an over-load therein, but will not permanently dis-establish said circuits.

Further objects and advantages of the present invention will be apparent from the following description, reference being had to the accompanying drawings, wherein preferred embodiments of said invention are clearly disclosed.

In the drawings:

Figure 1 is a top plan view of a part of the chassis of an automobile, illustrating the engine and certain of the units included in the present invention applied thereto.

Fig. 1ª is a sectional view of the generator shaft, taken on the line 1ª—1ª of Fig. 1, to show the clutch member.

Fig. 2 is a view in side elevation of the electric machine included in the present invention.

Fig. 3 is a view similar to Fig. 2, with one of the end housings of said machine entirely removed; the other end housing being partly removed to illustrate certain details normally contained within said end housing.

Figure 4:
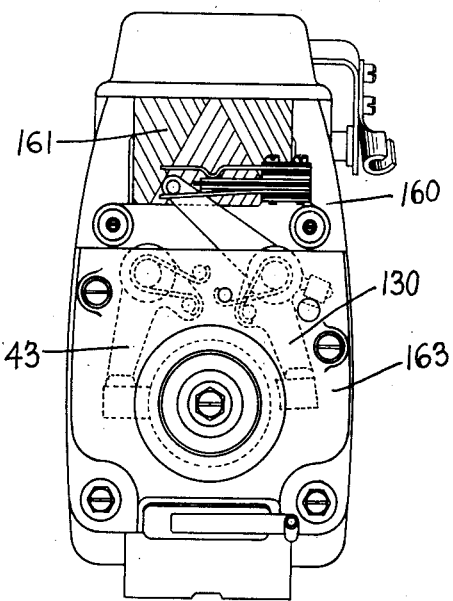
Fig. 4 is a view in elevation of the motor end of the electric machine.

Referring to the drawings and particularly to Fig. 1, the numeral 20 designates the side frames of the chassis of the automobile, while the numeral 21 indicates the engine, suitably mounted between the side frames 20 on the cross members 22.

The type of chassis and engine structure shown in the present instance is similar to that manufactured and placed on the market by many of the well known automobile concerns and comprises the usual engine, adapted to drive through power transmission devices which may be controlled by the ordinary means to secure the several different speeds, forward and the reverse speed.

The engine in the present instance is of the internal combustion type, and may comprise as many cylinders and may be varied as to the type of construction as desired. This engine is provided with a flywheel 23, having a series of teeth 24 formed on or secured to its periphery.

The dynamo electric machine 25, which is adapted to be driven as a motor for starting purposes, and as a generator for charging purposes, is suitably mounted at one side of the engine, in such a position that one end of the armature shaft 26 may be readily connected with the flywheel of the engine, when it is desired to operate the electric machine as a motor for starting purposes, while the other end of said armature shaft is so positioned as to be readily connected to certain driving mechanism, preferably the timing gears 27 of the engine, so that the electric machine may be driven as a generator by the engine.

The type of connections between the electric machine and engine are substantially the same as those shown in the U. S. patents to Charles F. Kettering, Nos. 1,150,523 and 1,177,055, and his co-pending application, Serial No. 721,237, filed September 19, 1912; and the co-pending application of Charles F. Kettering and William A. Chryst, Serial No. 778,934, filed July 14, 1913.

As will be apparent by referring to the above mentioned co-pending applications, and as is also illustrated in Fig. 1 of the present drawings, the electric machine as a motor is normally disconnected from the flywheel of the engine, but is adapted to be connected therewith by means of shiftable connections, which in the present instance are shown in the shape of a shiftable gearing 49, adapted to be moved into engagement with coöperating gear members carried by the armature shaft of the electric machine and the flywheel of the engine respectively.

This gearing 49 comprises a large gear wheel 28 and a small pinion 29, the large wheel 28 being adapted to engage with the armature pinion 30, while the small pinion 29 engages with the flywheel teeth 24, at such times as the gearing is moved into engaging position.

Under certain conditions, however, the teeth of the gear wheel 28 and the pinion 29 will lie in such a position that the end faces thereof will conflict with the end faces of the armature pinion 30, and the flywheel gear teeth 24, so as to interfere with or prevent the shifting of said gearing.

In order to overcome this difficulty, certain means are provided for imparting an initial movement to the connecting devices, whereby certain of said connecting devices will be rotating at such times as the shifting of the connecting devices takes place.

The idea of imparting an initial motor movement to the connecting devices, to facilitate the coupling up of the engine and electric machine for starting purposes, is clearly illustrated, described and claimed in the patent U. S. No. 1,150,523, but the manner of securing this initial movement in the present application, differs from that disclosed in the above patent, as will appear hereinafter.

As will be explained hereinafter, as soon as the connecting devices have been shifted into position to couple up the engine and electric machine as a motor, the main motor circuit will be closed and the engine cranked by the electric machine for starting purposes.

Now, upon the starting of the engine, the operator will release certain mechanism referred to hereinafter, whereby the connecting devices, including the large pinion 28 and the small pinion 29, will be shifted to their normal position to disengage the engine from the electric machine as a motor. However, the engine will immediately tend to drive the electric machine 25, as a generator, through the front end gearing shown in Fig. 1, by operating the pinion 71, which is secured to or driven by the crank shaft of the engine, and which in turn will drive with the idler pinion 94, which will tend to rotate the pinion 95, carried by the shaft 92. This shaft 92 is adapted to be coupled up to the armature 26 of the electric machine, through a clutch mechanism designated by the numeral 93, which is shown in Fig. 1ª. This arrangement of the driving of the electric machine as a generator, has been clearly described in the aforementioned co-pending applications, and further description thereof is not deemed necessary in the present case.

Figure 9:
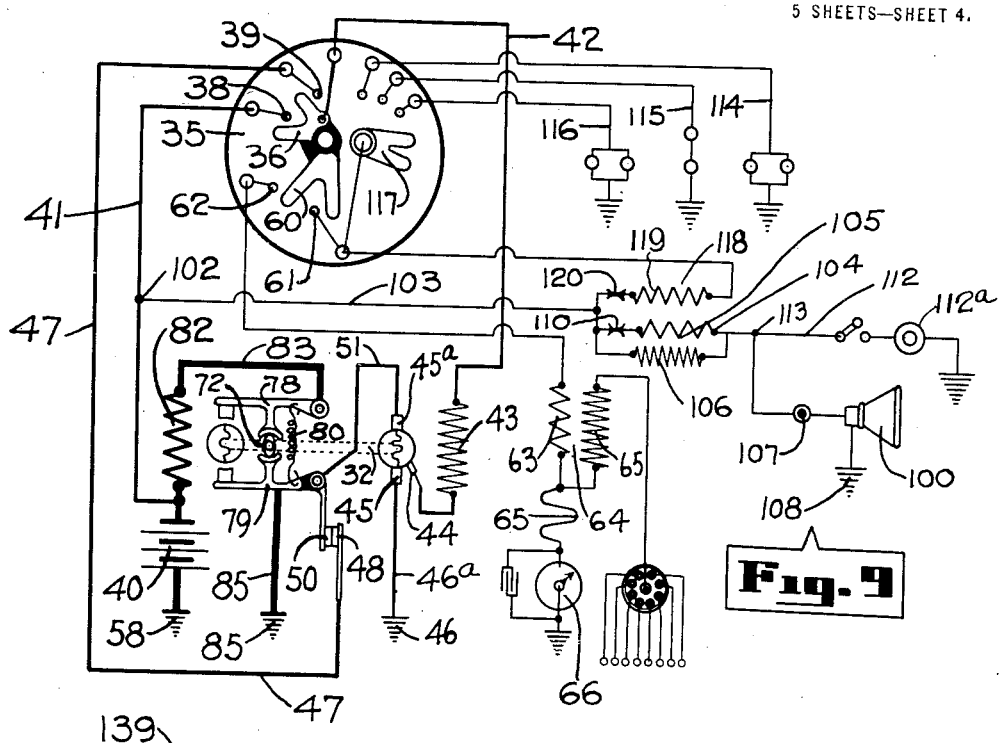
Fig. 9 is a diagrammatic view of the electrical circuits and connections of one system embodying the present invention.

By referring to Figs. 1, 3 and 9, it will be noted that the storage battery or accumulator 40 is included in the electrical system, and this battery may be contained in any suitable casing, and located on any suitable part of the machine, for instance as is shown in Fig. 1.

Figure 7:
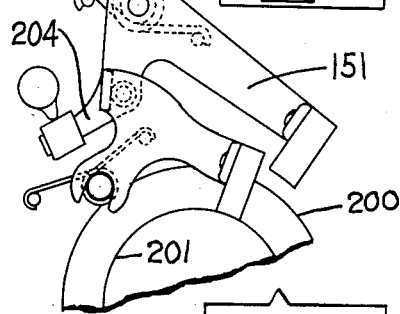
Figs. 7 and 8 are detail views of a modified form of brush structure, preferably used when the motor and generator commutators are positioned on the same end of the armature shaft.
Figure 8:
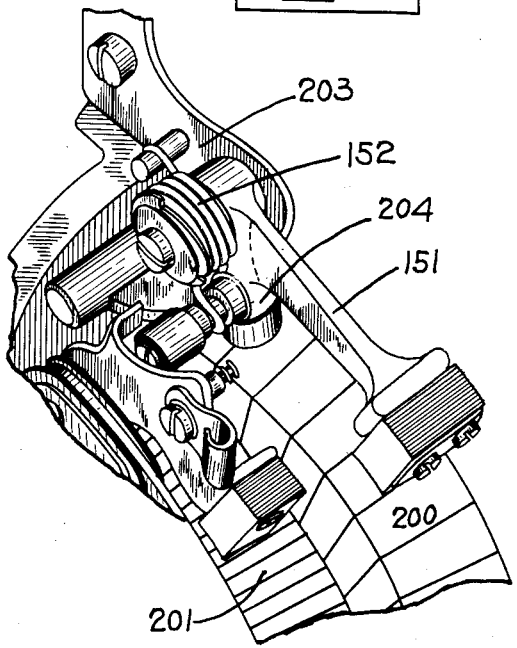

The dynamo electric machine 25 embodies separate and independent sets of motor and generator windings, which are connected to independent motor and generator commutators, one of which may be carried on each end of the armature 31, as is shown in Fig. 3, or both of these commutators may be positioned on the same end of the armature shaft, as is shown in detail in Figs. 7 and 8.

The electrical circuits and connections will be clear, from the following description of the type of system disclosed diagrammatically in Fig. 9.

Supposing that the combustion engine is at rest, and that it is desired to start the same. The controlling switch 35, which is embodied in the system shown in Fig. 9, is actuated so that the contact fingers 36 will engage with the terminals 38 and 39, thereby closing the following circuit:

From the accumulator 40, through the conductor 41 to contact point 38, through the element 36 to the conductor 42, thence through the generator field winding 43, across a part of the armature circuit, via what may be termed the third brush 44 and one of the main commutator brushes 45ª to the ground connection 46, thence back to the battery, via ground connection 58.

There will also be a flow of current from the terminal 38, through the element 36 of the switch 35, to the terminal 39, then through conductor 47, across the contact plates 48 and 50, through conductor 51 and across the main generator commutator brushes 45ª to ground connection 46 and thence back to the battery, via ground 58.

The same operation of the switch 35 which actuates the element 36, will also throw the contact plate 60 into position to close the ignition circuit through the following connections:

From the battery 40, through conductor 41 to terminal point 102, thence through the conductor 103, through the vibrating circuit breaker 118, the function of which will be described hereinafter, to the switch terminal 61, across the element 60 to the switch terminal 62, thence through the primary winding 63 of the induction coil 64, through the resistance 65 and across the timer 66, and back to the battery, via ground connections.

This ignition system may be similar to that included in the patent to Charles F. Kettering, No. 1,040,349, and his co-pending application Serial No. 592,291, filed November 14, 1910, and therefore a detailed description of the secondary circuits is not deemed necessary.

In connection with the previous description of the switch members 60 and 36, it will be understood that any suitable handle or controlling element may be provided for operating this switch in the desired manner.

From the above description, it will be noted that current is now passing from the battery 40, across the generator armature windings and through the generator field winding, in such a manner as to actuate the electric machine as a motor, but in view of the fact that the generator windings and circuit connections are of much higher resistance than the motor windings and circuit connections which will be described hereinafter, the initial motor movement of the electric machine will be with reduced torque and speed, as compared to the regular motor operation of said machine for starting purposes.

One of the functions of imparting this initial movement in this manner to the electric machine, is to effect the rotation of the armature pinion 30, relative to the pinion 28, so that the danger of the teeth of the shiftable gearing, including pinions 28 and 29, conflicting with the teeth of the armature pinion and the flywheel gearing, will be reduced to a minimum.

In Fig. 1, a main operating member, indicated by the numeral 70, is shown as connected to the foot pedal 71, which in turn is so arranged as to be easily accessible to the operator. This main operating member is connected in any suitable manner with the shiftable gearing 49, as for instance, by the rod 72, which is connected to a yoke member 72$^a$, (see Fig. 1).

This same rod 72 may also constitute the means for actuating the motor brushes, so as to make and break the main motor circuit, in accordance with the operation of the controlling member 71, that is, the free end of this rod 72 may pass through the frame of the electric machine, and will lie adjacent to said commutator brushes 78 and 79, so that when the main operating member 71 is thrown forward to couple up the starting device to the engine for starting purposes, these brushes 78 and 79 will be allowed to move into contact with the motor commutator, so as to close the main motor circuit.

By referring to Fig. 9, it will be noted that normally both motor commutator brushes are held in such a position that they will not contact with the motor commutator, and this position is maintained not only during the initial operation of the electric machine as a motor, but throughout the operation of the electric machine as a generator. This results in relieving the electric machine of any lag which might be due to the frictional resistance of either one or both of the motor brushes contacting with said commutator, during the operation of the electric machine, either as a generator or during the initial movement of the electric machine, and it also relieves the motor brushes from continuous wear.

Now, as soon as the operator has effected the initial operations referred to heretofore, the controlling pedal 71 will be depressed, so as to shift the gearing 49 into coupling position, and to concomitantly close the main motor circuit, and also break the generator armature circuit by the separation of the contact plates 48 and 50, which will be effected by the movement of the brush 79, into contact with the motor commutator.

The motor circuit, which will be closed by the actuation of the motor brushes 78 and 79, will be as follows:

From the battery 40, through the series field winding 82, conductor 83, through the brush 78 and across the armature windings to the brush 79, back to the battery, via conductor 85 and the grounds 84 and 58.

During this operation, however, the switch 35 will remain in such a position that the contact plates 36 and 60 will still tend to close the following circuit:

From the battery 40, through conductor 41 to the terminal 38, across the contact member 36 to the conductor 42, thence through the field winding 43 of the generator, through the third brush 44, across a part of the generator armature winding to the brush 45, back to the battery, via grounds 46 and 58.

The ignition circuit heretofore described, will remain in closed condition, so as to provide ignition throughout the starting operation.

From the above description, it will be seen that during the actual starting operation of the electric machine, not only the series field winding and the motor windings will be in effect, but there will be compounded with this, the effect of the generator field winding, plus the effect of the current which passes through this field winding, also passing through a part of the generator armature. This will result in an increased torque effect of the machine, and will assist in the starting operation of the electric machine.

It will now be seen that when the electric machine is operating as a motor for starting purposes, the effect of the series field will be to create a high torque motor, which will readily crank the engine. This high torque effect of the motor will be accentuated by the use of the gearing heretofore referred to as the shiftable gearing, whereby the motor will operate with high leverage relative to the engine.

It will also be noted that when the electric machine is operating as a motor for starting purposes, whatever effect is secured by passing current through the generator field winding 43, and through a part of the generator armature, will be added to the series field effect, thereby increasing the torque.

As soon as the engine has become self actuating, the operator releases the main operating member 71, permitting it to automatically return to its normal position, under the influence of a suitable spring 90.

The return of this main operating member to its normal position, will tend to disengage the gearing 49 from its driving connection with the electric machine and the engine, and at the same time the motor circuit will be disestablished by the movement of the motor brushes 78 and 79, away from the motor commutator.

The movement of the brush 79 away from its commutator will tend to establish the generator armature circuit, so that as soon as the engine has reached a determined speed, the electric machine will be driven as a generator through the front end gearing heretofore described.

This arrangement for driving the electric machine as a generator, has clearly been described in the U. S. patent to Charles F. Kettering, No. 1,150,523, and his co-pending application, Serial No. 721,237, filed September 19, 1912; and the co-pending application of Charles F. Kettering and William A. Chryst, Serial No. 778,934, filed July 14, 1913, and comprises a clutch 93 interposed between the timing gears and the armature, so that when the electric machine is operating at a greater speed than the engine, the armature will run free of the timing gears 91, but when the engine is operating at a speed greater than the electric machine, this clutch will tend to establish driving connection from the timing gears to the armature, through the shaft 92.

As soon as the electric machine tends to operate as a generator, current will pass from the positive brush 45$^a$ through the conductor 51 to the conductor 47, via contact plates 50 and 48 to the contact point 39 of the switch 35. From this contact point, the current will pass via element 36 to the point 38, directly to the battery, via conductor 41, across the battery to the ground connection 58, back to the opposite side of the generator, via ground connection 46, conductor 46$^a$, and main commutator brush 45.

The field circuit of the generator will be the same as heretofore described, current passing from the terminal 39, through conductor 42, through the field winding 43 to the third brush 44, thence across a part of the armature circuit to brush 45$^a$.

By providing this third brush 44, and positioning the same mediate the two main brushes 45 and 45$^a$, the regulating effect of the generator will be secured, whereby up to certain speeds of the generator, the rise of the charging current in the main line will be secured very rapidly, but beyond a critical speed, the magnetic effect of the winding 43, relative to the armature effect, due to field distortion, will decrease the field intensity and thereby decrease or maintain substantially constant the output of the generator. By providing the third brush 44 with the adjustable connection, the position of this brush may be changed to control and regulate the output of the electric machine, as desired.

The horn signaling circuit in the present instance is tapped from the conductor 103, and includes an overload circuit breaker 104, which is of the lock type. That is, this circuit breaker comprises a series winding or heavy coil 105, and a fine winding or locking coil 106.

The normal flow of current passes through the heavy winding 105, directly to the horn 100, at such times as the switch button 107 is actuated to close the circuit. One side of this horn circuit is grounded at 108, to complete the circuit with the opposite side of the battery.

Now, if short-circuits or grounds inadvertently occur, and an abnormal flow of current tends to pass through the heavy winding 105 of the circuit breaker, it will tend to actuate the circuit breaking armature shown diagrammatically at 110 in Fig. 9, and thereby break the main circuit.

As soon as this circuit is once broken, some of the current will pass through the fine winding 106, and the effect of current passing through this winding will tend to maintain the circuit breaking armature in position to break the horn circuit. Only a small amount of current will pass through the fine winding, due to its high resistance, and this amount of current will not be sufficient to actuate the horn mechanism, even though the horn button 107 may be actuated.

This overload circuit breaker will therefore prevent any abnormal flows of current through the horn parts and thereby prevent any injury to the horn or its coöperating parts, due to overloads.

Another work circuit, indicated by the numeral 112, is tapped from his horn circuit at the point 113, which may include any sort of work device 112$^a$, such as a tonneau light for the automobile, or a trouble lamp socket, and is also protected by said circuit breaker.

Suitable lighting circuits 114, 115 and 116 are provided for taking care of the various lights provided for the vehicle, these circuits being controlled by means of a switch element 117, embodied in the switch 35.

Another circuit breaker, which may be known as the vibrating circuit breaker 118, is included in the lighting circuits mentioned above, and in the ignition circuit heretofore described, and comprises a winding 119, which at such times as an overload tends to pass through said coil, will attract the circuit breaking member 120, and thereby break the circuit. Of course, as soon as the said circuit is broken, the winding 119 will become deënergized and the member 120 will return to close the circuit. This operation will be continuously repeated.

Figure 10:
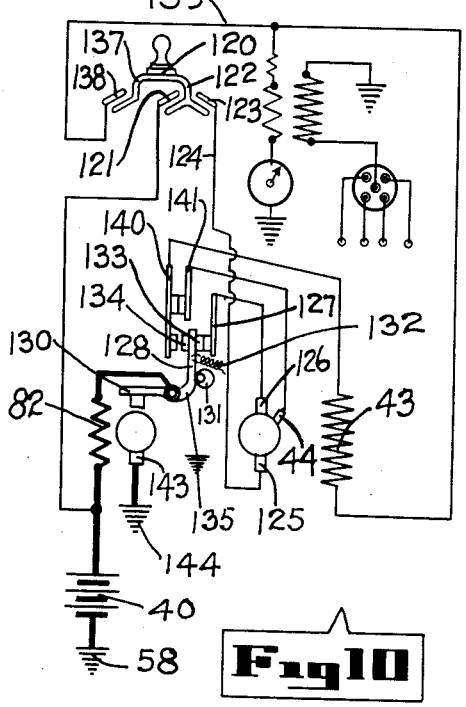
Fig. 10 is a diagrammatic view similar to Fig. 9, illustrating a system embodying certain modifications.

By referring to Fig. 10, a modified form of the system disclosed in Fig. 9, is diagrammatically illustrated.

In this modified form, the switch element 120 is first actuated to close the circuit connections between the accumulator and the generator, in order to impart an initial motor movement to the electric machine to facilitate the coupling up of the electric machine to the engine for starting purposes. For instance, when the switch element 120 is pulled out, the following circuits will be closed:

From the battery 40, through conductor 41, to the contact plate 121, across the conductive element 122 of the switch 120 to the contact plate 123. This contact plate in turn is connected with the conductor or wire 124, which leads directly to one of the main generator commutator brushes 125, across the generator armature winding to the brush 126, thence to the switch plate 127, to ground connection, via the arm 128, which is formed as a part of but insulated from the movable motor brush 130.

In this connection, it will be noted that the main operating member, designated in the present figure by the numeral 131, is normally in such a position that the spring 132 will maintain the armature brush in such a position that it will not be in contact with the motor commutator, except at such times as the operating member 131 is actuated. This arm 128 of the motor brush is provided with a pair of contact points 133 and 134, one of which normally engages with the contact plate 127, during the operation of the machine as a generator, and during the initial motor movement of the electric machine, so that the circuit across the generator armature is closed to the ground connection, by this arm of the motor brush 130.

Concomitantly with the closing of the generator armature circuit, the generator field circuit will be closed by the contact plate 137 of the switch 120 engaging with the plate 138, whereby a circuit will be set up from the battery 40, through conductor 41, across the conductive elements 122 and 137 of the switch 120, through the contact plate 138, to wire 139, through the generator field 43, across the contact plates 140 and 141, to the third brush 44, which is positioned mediate the two main generator brushes 125 and 126, for regulating purposes, as will be well understood.

From the third brush 44, current will pass through a part of the armature winding to brush 126, thence to the opposite side of the battery, via the contact plates 127 and 133 to ground connection 135.

As soon as the initial motor operation of the electric machine has been effected, the main operating member 131 will be actuated so as to force the movable motor brush 130 into engagement or contact with the motor commutator, to close the main motor circuit, which is as follows:

From the battery 40, through the series winding 82, to the brush 130, thence across the armature to the opposite side of the battery, via brush 143 and ground connection 144. By the movement of the brush 130 into contact with the motor commutator, the arm 128 will be so actuated as to break the main generator armature circuit by breaking the connection between the contact point 133 and plate 127. This same movement of the brush 130 will also break the field circuit through the third brush connection, and will establish the field circuit directly across the main generator brushes or across the terminals of the battery.

This is effected by the motor brush engaging with the plate 140, and actuating the same so as to break the connection of the plate 140 with the plate 141, and of course making connection between the plate 140 and the contact point 134, carried by the brush 130, so that during the actual starting operation of the electric machine, the following circuit will be closed.

From the battery 40, through conductor 41, through the switch 120 to the contact 138, thence to the generator field winding 43, via wire 139, directly to the opposite side of the battery, via the contact plate 140 and the motor brush arm 128 and ground connection 135.

From the above description, it will be seen that the effect of current flowing through the field winding 43 will be added to the effect of the current flowing through the series field winding 82, thereby increasing the field intensity and increasing the torque effect of the motor, during the actual starting operation.

As soon as the engine has become self-actuating, the operator will of course release the main operating member 131 and permit the parts to assume their normal position, that is, the same position as the various units were in during the initial motor operation.

Now, as soon as the speed of the electric machine reaches a determined point, the voltage of the generator will rise above the voltage of the battery 40, and will thereby tend to charge the battery with current which may be used for future starting operations or other purposes.

Figure 11:
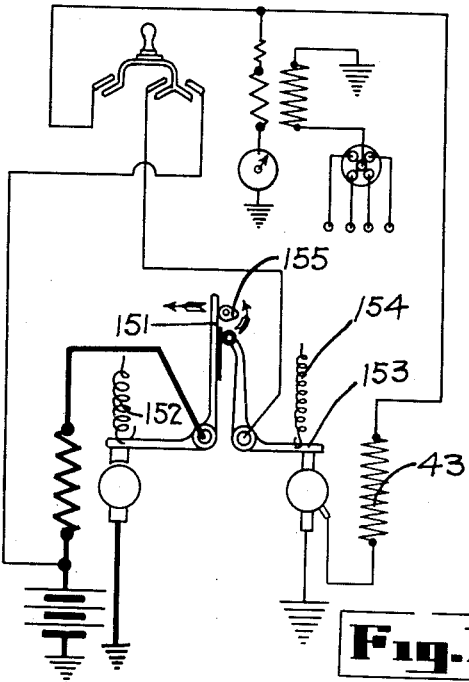
Fig. 11 is a diagrammatic view similar to Fig. 9, disclosing a further modified form.
Figure 13:
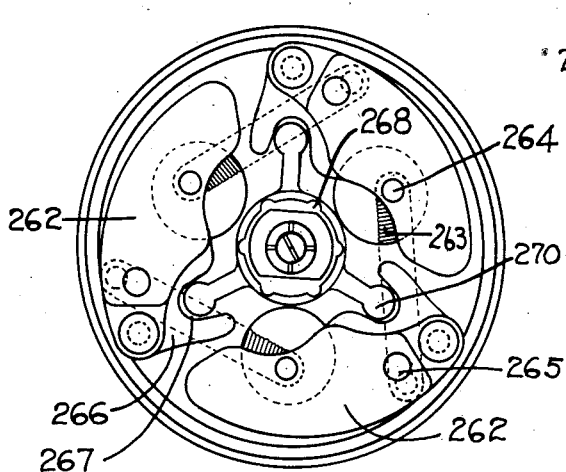
Fig. 13 is a top plan view of the unit disclosed in Fig. 12, with the distributer head and the casing carrying the timer contacts and rotor of the distributer removed to more clearly disclose the centrifugal governor or control.

Referring to Fig. 11, a further modified form of the present invention is disclosed, wherein one of the motor brushes 151 is normally maintained out of contact with its commutator, by means of the spring 152. This spring, which is relatively heavy, also tends to maintain the generator commutator brush 153 normally in contact with the generator commutator, overcoming the effect of the spring 154.

Now, when the main operating member, which is designated by the numeral 155 in the present instance, is actuated to bring the system into starting position, the brush 151 will be positively forced into contact with its commutator, inasmuch as the operation of the main operating member will overcome the effect of the spring 152. This operation therefore not only tends to move the motor brush 151 into contact with its commutator, but it also permits the spring 154, which is a lighter spring than the spring 152, to pull the generator brush 153 away from its commutator, so as to break the main generator circuit.

The circuit arrangements and the sequence of operations are substantially the same as those disclosed in Fig. 10, with the exception that during the starting operation of the system, that is, when the electric machine is operating as a motor to crank the engine, the generator field 43 is not connected directly to ground, but is connected to the third brush.

Figure 5:
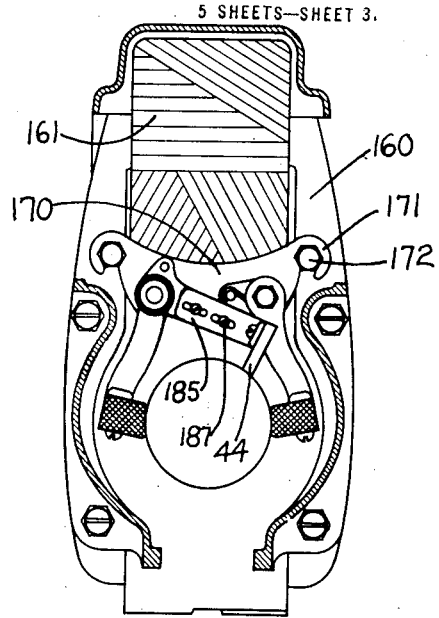
Fig. 5 is a view similar to Fig. 4, of the generator end of the electric machine.

By referring to Figs. 4 and 5, detail end views of the electric machine are disclosed, wherein the side frames of the electric machine are designated by the numerals 160, which form a support for the field windings 161, and also provide the mass through which the magnetic circuit passes. The armature is mounted between the side frames 160, in suitable bearings formed in the end housing 163, only one of which is shown, see Fig. 4. This end housing 163 carries the commutator brushes 130 and 143.

The form of generator disclosed in Figs. 4 and 5, is substantially the same generator structure as that disclosed diagrammatically in Fig. 10, and this form has simply been selected for structural illustration, in order to clearly show the combinations of the different parts, and the relative location thereof in the actual generator construction.

The switch which comprises the contact plates 127, 141 and 140 respectively, and the coöperating contact arm 128, which is shown in Fig. 10, as forming a part of but insulated from the motor brush 130, is clearly disclosed in Fig. 4.

Fig. 5 discloses the generator end of the electric machine, and substantially illustrates the structure shown in both Figs. 9 and 10.

Figure 6:
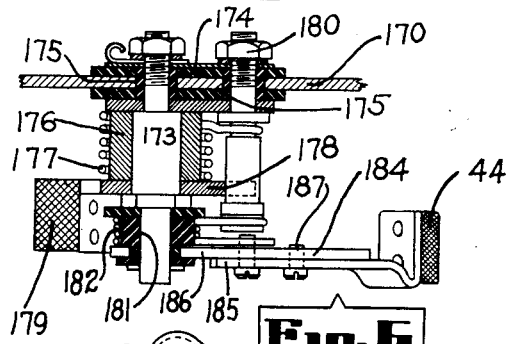
Fig. 6 is a detail view of part of the brush arrangement disclosed in Fig. 5.

In Fig. 6, the detail structure of the third brush and the manner of mounting the same relative to one of the main generator brushes, is clearly disclosed. In this view, the mounting plate 170 is preferably provided with a pair of hooked portions 171, see Fig. 5, which engage with suitable lugs 172, projecting from the generator side frames 160. A suitable terminal bolt 173 passes through the mounting plate and is thoroughly insulated therefrom by means of suitable washers 174, and a sleeve 175. This bolt 173 is provided with a sleeve 176, which forms a support for the spring 177, as well as a spacing block for the brush holder 178. This brush holder 178 carries one of the main commutator brushes 179 in such a position that it will readily engage with the generator commutator carried by the armature.

The spring 177, which tends to hold the commutator brush 179 in contact with its commutator, is connected at one end with the supplemental bolt 180, while the other end thereof is fastened to any suitable part of the brush arm 178.

Mounted on the extreme end of the bolt 173 there is an insulating sleeve 181, which carries the spring 182, one end of which is secured to the brush holder 184, while the other end thereof is also secured to the supplemental bolt 180, the function of this spring being of course to maintain the brush 44 in contact with the generator commutator.

The brush holder 184 is mounted adjacent to the insulating sleeve 181, and comprises a pair of plates 185 and 186, secured together by means of bolts 187, which pass through elongated slots formed in the plate 185. By loosening these bolts 187, it will be readily seen that the brush arm may be lengthened or shortened, in order to adjust the brush 44, relative to the commutator surface.

The arrangement of the movable motor and generator brushes, and the main operating member, together with the springs 152 and 154 respectively, is structurally shown in Fig. 7. In this particular type of machine, the commutators are preferably arranged both on the same end of the armature shaft. A more detail disclosure of this structure is disclosed in Fig. 8, wherein the motor commutator is designated by the numeral 200, and the generator commutator is designated by the numeral 201.

The movable motor brush 151 is preferably mounted upon a mounting plate 203, and is maintained out of contact making position by means of the spring 152. The motor brush 151 has a projecting end 204, provided with a roller or other suitable engaging surface for the main operating member 155.

By referring to Figs. 2 and 3, and also to Figs. 12 to 16 inclusive, it will be noted that the dynamo electric machine is provided with end housings, one of which is shown in Fig. 4, and has been referred to heretofore by the numeral 163, the other of which is shown in Fig. 2, and referred to by the numeral 250. These end frames or housings are secured to the generator frames in any suitable manner, and form a support for the top end housings 251, which are securely held in position by means of bails 252, which are pivotally mounted in the generator casing, and which are adapted to slip over and engage in the notched portion 253, formed on the top cover of the end housings.

In Fig. 2, an ignition unit is shown as combined with the dynamo electric machine, and comprises a casing 255, fastened to the end housing 250, by any suitable means, such as indicated by the numeral 256. This ignition unit is provided with any suitable driving connection with the crank shaft of the engine, such as for instance, as is shown in the co-pending application of Charles F. Kettering and William A. Chryst, Serial No. 752,733, filed March 7, 1913, it being understood that the ignition unit may be operated at any desired ratio, relative to the speed of the engine.

As has been stated heretofore, one of the objects of this invention is to provide an ignition unit, wherein the time of occurrence of the sparking impulses in the ignition circuits may be automatically controlled, or may be manually or mechanically controlled, as may be desirable.

It is a further object of the present invention to combine the automatic control of the ignition system in such a manner that this type of control will automatically actuate the timer cam, and the rotor of the distributer, by the movement of these parts, relative to the timer contacts and the distributing contacts, respectively, in combination with a manually operated control which is arranged to actuate the timer contacts and the distributer contacts, relative to the timer cam and the rotor of the distributer.

By referring to Figs. 12 to 16 inclusive, it will be seen that the shaft 257 extends into the casing 258, but this shaft is operable relative to said casing, and is not connected thereto. The shaft 257 may be termed the driving shaft of the ignition unit, but it is not thought necessary to describe or illustrate the driving connections between this shaft and the engine actuated parts, inasmuch as these connections are clearly described in the heretofore referred to co-pending application, Serial No. 752,733, filed March 7, 1913.

This shaft is pinned to a collar 259, by means of the pin 290, said collar being formed integral with or secured to the disk 261. This disk or plate 261 carries a plurality of pins 260, which form a pivotal mounting for weight elements 262, see Figs. 12 and 14 particularly. Each of these weights are preferably made up of a number of different punchings or formed pieces, as is clearly shown in Fig. 12, but, of course, may be made of a single solid piece if so desired.

The free end of the respective weight elements are connected to the disk 261, by means of the resilient or flexible connection 263, which in the present instance constitutes coil springs. One end of these springs is secured to a pin 264, carried by the weight elements, while the opposite ends of said springs are connected to points 265, which are carried by the disk 261. These springs normally maintain the weights in what may be termed closed position. Each of the weight elements are provided in turn with a flanged portion 266, provided with a depression or cut-away portion 267, which is adapted to receive an arm 270 of the spider 272, see Figs. 12 and 15.

This spider forms the carrying element for the timer cam 268, and the rotor 269 of the distributer.

Figure 14:
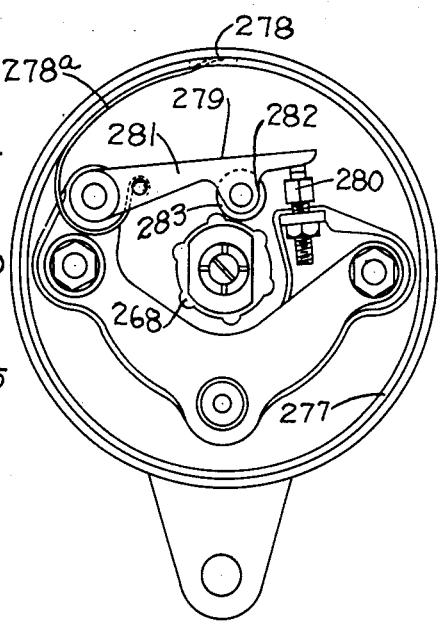
Fig. 14 is a top plan view similar to Fig. 13, with the casing carrying the timer contacts and showing the timer cam in position.
Figure 12:
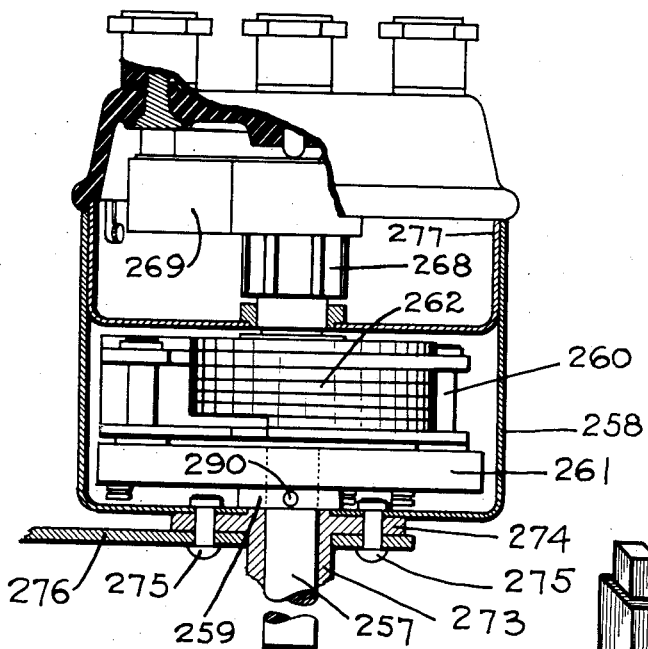
Fig. 12 is a view in elevation of a timing and distributing unit for the ignition system embodied in the present invention, certain of the parts of this unit being shown in section for the sake of clearness.

By referring to Fig. 14, the relative location of the timer cam 268 and the timer contacts is clearly shown, while in Fig. 12, the relative location of the rotor of the distributer and the distributer contacts is clearly shown.

Figure 15:
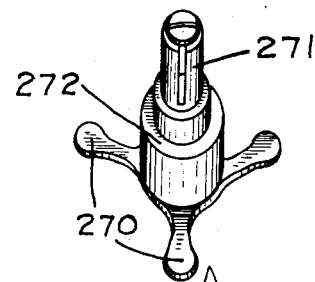
Figs. 15 and 16 are detail views of certain of the elements embodied in the ignition unit.
Figure 16:
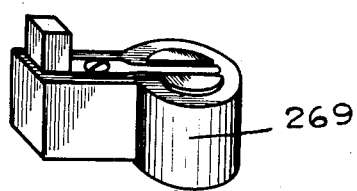

The spider 272, shown in detail in Fig. 15, comprises a plurality of arms 270, so spaced apart as to readily engage within the depressions or cut-away portions formed in the weights 262, each of these arms having an enlarged rounded end portion to snugly fit within the depression formed in the weight, and still readily permit movement of the weight relative to the arm. This spider is connected to the driving shaft 257 solely by its connection above described, with each of the weight elements 262.

The upper end of the spider is provided with a reduced portion 271, which carries the timer cam 268 and the rotor of the distributer, as described hereinafter.

The casing 258 which contains the elements heretofore described, and through which the shaft 257 passes, is provided with a sleeve 273 having a flange portion 274, said sleeve surrounding the shaft 257 and being connected to the casing 258, by means of fastening bolts or rivets 275, which also secure a suitable handle or operating rod 276 rigidly to the casing.

From the above description, the operation of the device shown in Figs. 12 to 16 inclusive, will be as follows:

When the engine or other driving means actuates the shaft 257, the disk 261, the weight elements 262, the spider 272, which carrries the timer cam and rotor of the distributer, will all turn the rod concomitantly with the shaft 257.

Now, as the speed of this shaft increases, which of course is the equivalent to the speed of the engine increasing, the weight elements 262, under the effect of centrifugal force, will tend to fly apart, against the tension of the springs 263. The movement of the weights 262, due to the effect of centrifugal force, will be transmitted to the timer cam and rotor of the distributer, through the connection of the weights with the spider element 272.

It will therefore be seen that as the weights move outwardly, the timer cam will be moved relative to the timer contacts and will therefore effect an advance in the time of closing the primary circuit of the ignition system, and inasmuch as the rotor of the distributer is carried by the same member as the timer cam, the time of closing the secondary circuits by the operation of the rotor of the distributer, relative to the distributer contacts will be advanced or moved in exactly the same proportion as the timer cam.

However, it will be appreciated that under certain conditions, it may be desirable to manually control the time of occurrence of the sparking impulses, and in the present instance, this is effected by connecting the casing which carries the distributer contacts and the timer contacts with a controlling member which may be readily actuated by the operator, to advance or retard the time of occurrence of the sparking impulses.

The timer contacts are mounted within a casing or cup 277, which fits within the casing 258, and is secured thereto by means of a bayonet joint construction in any suitable manner. This inner cup or casing is prevented from movement relative to the outer casing, not only by means of this bayonet joint construction, but also by providing a spring 278ª, one end of which projects through an opening formed in this inner casing, pressing against the inner face of the outer casing as at 278. The opposite end of said spring is connected to the movable contact element 279, which is adapted to be moved into and out of contact with the fixed contact 280, and thereby control the making and breaking of the primary circuit of the ignition circuit.

This movable contact element comprises a plate 281, formed to provide a pair of lugs 282, between which the contact roller 283 is suitably positioned. From the above, it will be seen that the spring 278ª not only tends to prevent relative movement between the cup 277 and the outer casing 258, but it also tends to maintain the movable contact plate 281 in engagement with the stationary contact point 280, except when the same is actuated by the lobes of the timer cam.

While the form of mechanism herein shown and described constitutes a preferred form of embodiment of the present invention, it is to be understood that other forms might be adopted, all coming within the scope of the claims which follow.

What we claim is as follows:

1. In an engine starting system, the combination with an engine, of a starting device therefor, including a dynamo electric machine having a motor field and armature circuit, and an independent generator armature circuit and a generator field circuit connected across part of the armature circuit to regulate the output of the machine, when operating as a generator; an accumulator having circuit connections with said machine; and controlling means operable to break the motor field and armature circuits when the machine is operating as a generator, and to establish the generator field and armature circuits with the accumulator for charging purposes, and operable to establish the motor field and armature circuits, and to break the generator armature circuit and establish the generator field circuit directly across a portion of the motor circuit when the machine is operating as a motor.

2. In an engine starting system, the combination with an engine, of a starting device therefor, including a dynamo electric machine having a motor field and armature winding, and an independent generator field and armature winding, said generator field winding being connected across part of the generator armature circuit to regulate the output of the electric machine when operating as a generator; an accumulator having circuit connections with said machine, and including a main generator circuit; and means for selecting the motor armature and field circuit and for breaking the main generator armature circuit when the machine is to operate as a motor for starting purposes, whereby the generator field circuit connected across part of the armature circuit will assist the motor field and armature circuits during the starting operation.

3. In an engine starting system, the combination with an engine, of a starting device therefor, including a dynamo electric machine having motor field and armature circuits, and a commutator and commutator brushes, and generator field and armature circuits having main commutator brushes and a supplemental commutator brush positioned mediate said main brushes and connected with one end of the field circuit to regulate the output of the machine when operating as a generator; an accumulator; circuit connections between said accumulator and the electric machine, comprising a main generator circuit connected to said main brushes; and controlling means operable to a starting position to establish the motor field and armature circuits, and to establish the generator field circuit through the supplemental brush to one of the main brushes, and to disestablish the generator armature circuit, whereby the effect of the generator field winding will be combined with the effect of the motor field winding when the machine operates as a motor for starting purposes.

4. In an engine starting system, the combination with an engine, of a starting device therefor, including a dynamo electric machine having motor field and armature circuits; a generator armature circuit including main commutator brushes and a supplemental commutator brush positioned mediate said main brushes; an accumulator; a main generator circuit connected to said main brushes; a field circuit connected to one of said main brushes and to the supplemental brush to effect the regulation of the machine when operating as a generator; and a main operating member operable to a starting position to establish the motor field and armature circuits and to dis-establish the generator armature circuit and the field circuit through the supplemental brush and to establish the generator field circuit across a portion of the motor circuit, whereby the generator field will be compounded with the motor field when the machine operates as a motor.

5. In an engine starting system, the combination with an engine, of a starting device therefor, including a dynamo electric machine having motor field and armature circuits; a generator armature having main commutator brushes and a supplemental commutator brush positioned mediate said main brushes; an accumulator; a main generator circuit connected to said main brushes; a field circuit connected to one of said main brushes and to the supplemental brushes to effect the regulation of the machine when operating as a generator; and a main operating member operable to a starting position to establish the motor field and armature circuits and to dis-establish the generator armature circuit and the field circuit through the supplemental brush and to establish the generator field circuit across a portion of the motor circuit, whereby the generator field will be compounded with the motor field when the machine operates as a motor, said means being operable when released by the operator to automatically break the motor circuits and make the main generator armature circuit, and establish the generator field circuit between the supplemental brush and one of the main brushes, for charging purposes.

6. In an engine starting system, the combination with an engine, of a starting device therefor, including a dynamo electric machine having a motor field and armature winding, and an independent generator field and armature winding, said generator field winding being connected across a part of the generator armature circuit to regulate the output of the electric machine when operating as a generator, said electric machine being normally disconnected from the engine; means operable to connect the electric machine with the engine for starting purposes; an accumulator having circuit connections with said machine; and means for initially closing the circuit connections between the accumulator and the generator field and armature circuit to impart an initial motor movement to the electric machine to facilitate its coupling up with the engine, and a controlling member operable to establish circuit connections between the accumulator and the motor field and armature circuits, and to dis-establish the generator armature circuit when the machine operates as a motor for starting purposes.

7. In an engine starting system, the combination with an engine, of a starting device therefor, including a dynamo electric machine normally disconnected from said engine having a motor field and armature winding, and an independent generator field and armature winding, said generator field winding being connected across a part of the generator armature circuit to regulate the output of the electric machine when operating as a generator; means operable to connect the electric machine with the engine for starting purposes; an accumulator having circuit connections with said machine; and means for initially closing the circuit connections between the accumulator and the generator field and armature circuit to impart an initial motor movement to the electric machine to facilitate its coupling up with the engine, and a controlling member operable to establish circuit connections between the accumulator and the motor field and armature circuits, and to dis-establish the generator armature circuit and to break the generator field circuit across a part of the armature and to establish it a portion of the motor circuit, whereby the full effect of the generator field winding will be compounded with the effect of the motor field winding for starting purposes.

In testimony whereof we affix our signatures in the presence of two subscribing witnesses.

CHARLES F. KETTERING.
WILLIAM A. CHRYST.

Witnesses:
J. W. McDONALD,
O. D. MOWRY.